(12) United States Patent
Polk, III

(10) Patent No.: US 10,506,897 B2
(45) Date of Patent: Dec. 17, 2019

(54) MIXING ASSEMBLY FOR MIXING A PRODUCT

(71) Applicant: Shorefield Holdings, LLC, Cleveland, OH (US)

(72) Inventor: Louis Frederick Polk, III, Eden Prarie, MN (US)

(73) Assignee: Shorefield Holdings, LLC, Cleveland, OH (US)

( * ) Notice: Subject to any disclaimer, the term of this patent is extended or adjusted under 35 U.S.C. 154(b) by 0 days.

(21) Appl. No.: 15/481,652

(22) Filed: Apr. 7, 2017

(65) Prior Publication Data
US 2017/0251881 A1    Sep. 7, 2017

Related U.S. Application Data

(63) Continuation-in-part of application No. 15/061,952, filed on Mar. 4, 2016.

(51) Int. Cl.
*A47J 43/27* (2006.01)
*A47J 31/00* (2006.01)
*B01F 13/00* (2006.01)
*B65D 25/02* (2006.01)

(52) U.S. Cl.
CPC ........... *A47J 43/27* (2013.01); *B01F 13/0022* (2013.01); *B01F 2215/0022* (2013.01)

(58) Field of Classification Search
CPC ................................ A47J 43/27; A47J 31/005
See application file for complete search history.

(56) References Cited

U.S. PATENT DOCUMENTS

| | | |
|---|---|---|
| 1,641,155 A | 9/1927 | Clausing |
| 3,164,375 A | 1/1965 | Frenkel |
| 3,758,222 A | 9/1973 | Oakes |
| D247,279 S | 2/1978 | Marceca |
| D294,218 S | 2/1988 | Johnson |
| 4,832,968 A | 5/1989 | Forage et al. |

(Continued)

FOREIGN PATENT DOCUMENTS

FR    712629    10/1931

OTHER PUBLICATIONS

Ex Parte Quayle Action cited in U.S. Appl. No. 29/557,096 dated Apr. 25, 2017, 4 pgs.
(Continued)

*Primary Examiner* — Tony G Soohoo
*Assistant Examiner* — Elizabeth Insler
(74) *Attorney, Agent, or Firm* — Cooper Legal Group, LLC

(57) ABSTRACT

A mixing assembly includes a container having a wall that defines an interior chamber within which a product is received. A mixing structure is received within the interior chamber and mixes the product. The mixing structure has a body portion that extends along a body axis between a first end and a second end. The first end of the body portion has a first cross-sectional size. The second end of the body has a second cross-sectional size that is larger than the first cross-sectional size. The body portion has a wall that extends helically about the body axis between the first end and the second end. The wall defines a channel that extends helically about the body axis. An end axis extends perpendicular to the body axis radially outwardly to an exterior of the body portion through an opening defined by the wall.

20 Claims, 5 Drawing Sheets

(56) References Cited

U.S. PATENT DOCUMENTS

| | | | |
|---|---|---|---|
| 4,892,429 A | 1/1990 | Giannuzzi | |
| 5,000,658 A * | 3/1991 | Niskanen | B01F 7/086 198/550.1 |
| 5,085,431 A | 2/1992 | McGuire | |
| 5,160,225 A | 11/1992 | Chern | |
| 5,182,087 A | 1/1993 | Lilja et al. | |
| 5,316,193 A | 5/1994 | Heiberger | |
| 5,441,118 A | 8/1995 | Cruz, Jr. | |
| 5,494,198 A | 2/1996 | Heiberger | |
| D368,943 S | 4/1996 | Johnson | |
| 5,901,882 A | 5/1999 | Siegel | |
| 5,944,486 A | 8/1999 | Hodgkins, Jr. | |
| D421,557 S | 3/2000 | Wang | |
| D422,173 S | 4/2000 | He | |
| 6,164,469 A | 12/2000 | Sartore | |
| 6,379,032 B1 | 4/2002 | Sorensen | |
| 6,419,436 B1 | 7/2002 | Gaudron | |
| D462,895 S | 9/2002 | Gaudron | |
| D466,371 S | 12/2002 | Parker | |
| 6,679,661 B2 | 1/2004 | Huang | |
| 6,755,835 B2 | 6/2004 | Schultheiss et al. | |
| D528,862 S | 9/2006 | Li | |
| D566,468 S | 4/2008 | Sandy | |
| D593,141 S | 5/2009 | Gaudron | |
| D605,933 S | 12/2009 | Gaudron | |
| D609,969 S | 2/2010 | McKinney | |
| 7,722,299 B2 | 5/2010 | Lenander | |
| 7,753,234 B1 | 7/2010 | Heiberger | |
| D626,409 S | 11/2010 | Hooley | |
| D628,483 S | 12/2010 | McKinney | |
| D633,379 S | 3/2011 | Chambers et al. | |
| D637,871 S | 5/2011 | Frank | |
| 7,934,895 B2 | 5/2011 | Ernst | |
| D641,587 S | 7/2011 | Colburn | |
| D642,900 S | 8/2011 | McDuff et al. | |
| 8,029,215 B2 | 10/2011 | Gentry | |
| D657,251 S | 4/2012 | Rinderer | |
| 8,192,123 B2 | 6/2012 | Ernst | |
| D664,392 S | 7/2012 | Enghard | |
| 8,210,375 B2 | 7/2012 | Heiberger | |
| 8,584,877 B2 | 11/2013 | Heiberger | |
| D696,551 S | 12/2013 | Meyers | |
| 8,646,663 B2 | 2/2014 | Heiberger | |
| D701,254 S | 3/2014 | Carlson | |
| 8,858,145 B2 | 10/2014 | Su et al. | |
| D717,601 S | 11/2014 | Dixon | |
| D737,443 S | 8/2015 | Ciravolo et al. | |
| D739,174 S | 9/2015 | Elsaden | |
| D741,637 S | 10/2015 | Palermo | |
| D747,624 S | 1/2016 | Walker | |
| 9,248,423 B2 | 2/2016 | Cerasani | |
| D764,232 S | 8/2016 | Marina et al. | |
| D771,990 S | 11/2016 | Horowitz | |
| D775,893 S | 1/2017 | Buckley et al. | |
| D777,518 S | 1/2017 | Frazier | |
| D779,872 S | 2/2017 | Bergstrom | |
| D780,516 S | 3/2017 | Cornelius | |
| D781,104 S | 3/2017 | Cerasani | |
| 9,587,662 B2 | 3/2017 | Glass | |
| 9,593,705 B2 | 3/2017 | Call et al. | |
| D788,197 S | 5/2017 | Ford | |
| 9,687,915 B2 | 6/2017 | Durfee | |
| 9,731,358 B2 | 8/2017 | Allen et al. | |
| 2002/0130600 A1 | 9/2002 | Bigio | |
| 2004/0047231 A1 | 3/2004 | Coll | |
| 2004/0146377 A1 | 7/2004 | Chen | |
| 2005/0008450 A1 | 1/2005 | Gauthier | |
| 2005/0031434 A1 | 2/2005 | Gaudron | |
| 2005/0079027 A1 | 4/2005 | Ernst | |
| 2005/0084360 A1 | 4/2005 | Panasik et al. | |
| 2006/0018730 A1 | 1/2006 | Ernst | |
| 2006/0051491 A1 | 3/2006 | Levitt | |
| 2010/0224631 A1 | 11/2010 | Roth | |
| 2010/0290849 A1 | 11/2010 | Mirchandami | |
| 2012/0195704 A1 | 8/2012 | White | |
| 2014/0231378 A1 | 8/2014 | Roos | |
| 2014/0363244 A1 | 12/2014 | Allen | |
| 2014/0363249 A1 | 12/2014 | Oka | |
| 2016/0223005 A1 | 8/2016 | Hettich | |
| 2016/0223006 A1 | 8/2016 | Hettich | |
| 2017/0065943 A1 | 3/2017 | Dayton | |

OTHER PUBLICATIONS

Reply Ex Parte Quayle Action cited in U.S. Appl. No. 29/557,096 dated Jun. 26, 2017, 4 pgs.

Notice of Allowance cited in U.S. Appl. No. 29/557,096 dated Sep. 13, 2017, 5 pgs.

Ex Parte Quayle Action cited in U.S. Appl. No. 29/557,098 dated Apr. 28, 2017, 5 pgs.

Reply Ex Parte Quayle Action cited in U.S. Appl. No. 29/557,098 dated Jun. 26, 2017, 5 pgs.

Notice of Allowance cited in U.S. Appl. No. 29/557,098 dated Aug. 8, 2017, 5 pgs.

* cited by examiner

MIXING ASSEMBLY FOR MIXING A PRODUCT

CROSS-REFERENCE TO RELATED APPLICATIONS

This application is a continuation-in-part of U.S. patent application Ser. No. 15/061,952, filed on Mar. 4, 2016, the entire disclosure of which is hereby incorporated by reference.

TECHNICAL FIELD

The instant application is directed towards a mixing assembly. For example, the instant application is directed towards a mixing assembly for mixing a product.

BACKGROUND

Mixing assemblies may be used to mix a product. A mixing assembly may be used, for example, to mix a heterogeneous product into a homogeneous product.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a mixing assembly comprises a container having a wall that defines an interior chamber within which a product to be mixed is received. The mixing assembly comprises a mixing structure configured to be received within the interior chamber and mix the product. The mixing structure has a body portion that extends along a body axis between a first end of the body portion and a second end of the body portion. The first end of the body portion has a first cross-sectional size. The second end of the body has a second cross-sectional size that is larger than the first cross-sectional size. The body portion has a wall that extends helically about the body axis between the first end and the second end. The wall defines a channel that extends helically about the body axis between the first end and the second end. The wall has a wall length, along a wall axis that is substantially parallel to the body axis, between a first edge of the wall and a second edge of the wall. The channel has a channel length, along a channel axis that is substantially parallel to the body axis, between the first edge of the wall and a third edge of the wall, the wall length larger than the channel length. An end axis extends perpendicular to the body axis from a center of the second end of the body portion radially outwardly to an exterior of the body portion. The end axis passes through an opening defined by the wall such that the end axis does not intersect any of the body portion.

In an example, a mixing assembly comprises a container having a wall that defines an interior chamber within which a product to be mixed is received. A mixing structure is configured to be received within the interior chamber and mix the product. The mixing structure is movable within the container with respect to the wall. The mixing structure has a body portion that extends along a body axis between a first end of the body portion and a second end of the body portion. The first end of the body portion has a first cross-sectional size. The second end of the body has a second cross-sectional size that is larger than the first cross-sectional size. The body portion has a wall that extends helically about the body axis between the first end and the second end. The wall defines a channel that extends helically about the body axis between the first end and the second end. The product flows through the channel to mix the product as the mixing structure moves within the container. An end axis extends perpendicular to the body axis from a center of the second end of the body portion radially outwardly to an exterior of the body portion. The end axis passes through an opening defined by the wall such that the end axis does not intersect any of the body portion In an example, a mixing assembly comprises a mixing structure configured to be received within an interior chamber of a container. The mixing structure is movable within the container to mix a product. The mixing structure has a body portion that extends along a body axis between a first end of the body portion and a second end of the body portion. The first end of the body portion has a first cross-sectional size. The second end of the body has a second cross-sectional size that is larger than the first cross-sectional size. The body portion has a wall that extends helically about the body axis between the first end and the second end. The wall defines a channel that extends helically about the body axis between the first end and the second end. An end axis extends perpendicular to the body axis from a center of the second end of the body portion radially outwardly to an exterior of the body portion. The end axis passes through an opening defined by the wall such that the end axis does not intersect any of the body portion.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

Figure 1:
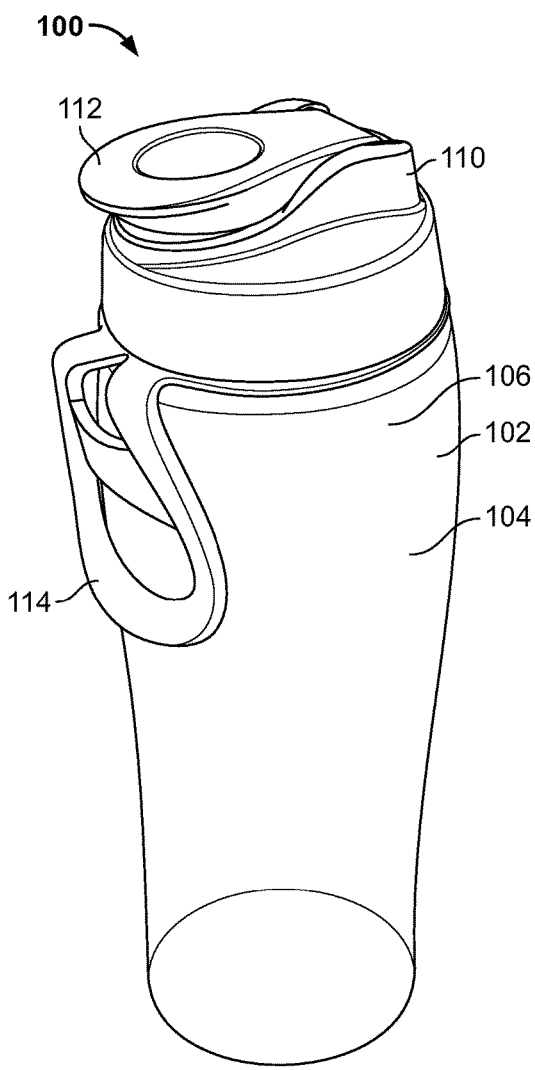
FIG. 1 is an illustration of an example mixing assembly.
Figure 2:
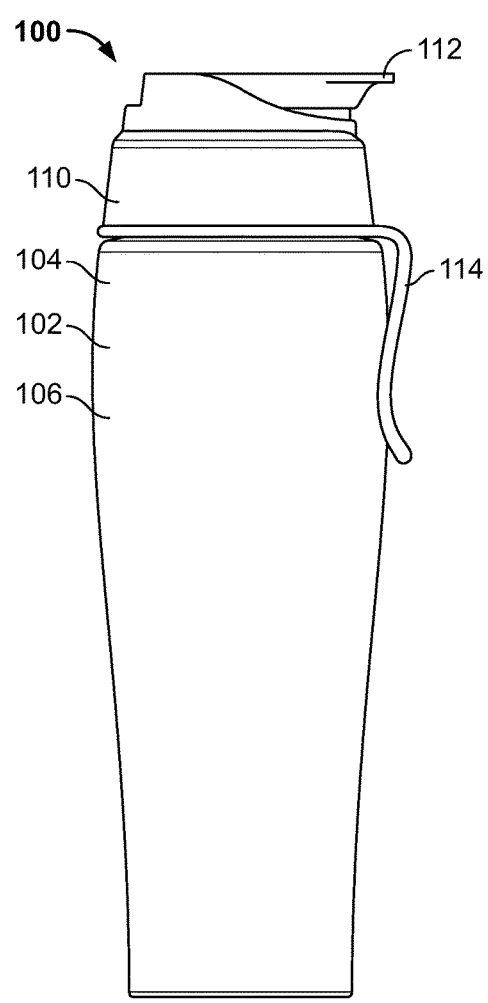
FIG. 2 is an illustration of a portion of an example mixing assembly.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Referring to FIG. 1, an example mixing assembly 100 is illustrated. The mixing assembly 100 can be used to assist in mixing a heterogeneous product into a substantially homogeneous product. For example, the mixing assembly 100 may contain a substantially heterogeneous, unmixed product comprising a liquid (e.g., water, milk, juice, etc.) and a non-liquid (e.g., a powder, a protein powder, a dietary supplement, etc.). The mixing assembly 100 can assist in mixing the liquid and the non-liquid so as to form a substantially homogeneous mixture.

The mixing assembly 100 may comprise a container 102. The container 102 has a wall 104 that defines an interior chamber 106 within which a product (e.g., a liquid (e.g., water, milk, juice, etc.) and a non-liquid (e.g., a powder, a protein powder, a dietary supplement, etc.)) to be mixed is received. In an example, the mixing assembly 100 can be shaken by a user to assist in the mixing. The container 102 comprises any number of resilient, non-flexible materials, that are resistant to corrosion, breakage, fracturing, leakage, etc. For example, the container 102 may comprise plastics, composite materials, or the like.

The mixing assembly 100 may comprise a cover 110. The cover 110 can selectively shield an opening defined by the wall 104 of the container 102. In an example, the cover 110 may comprise a removable cap that can be selectively attached to the container 102 or removed from the container 102. In the illustrated example, the cover 110 has a cap 112. The cap 112 can selectively cover an opening defined within the cover 110. The cap 112 can be attached in any number of ways to the cover 110, such as by a hinge, or the like. In some examples, a holder 114 can be provided in attachment to the container 102. The holder 114 comprises a loop defining an opening that facilitates holding of the mixing assembly 100 by the user.

Figure 3:
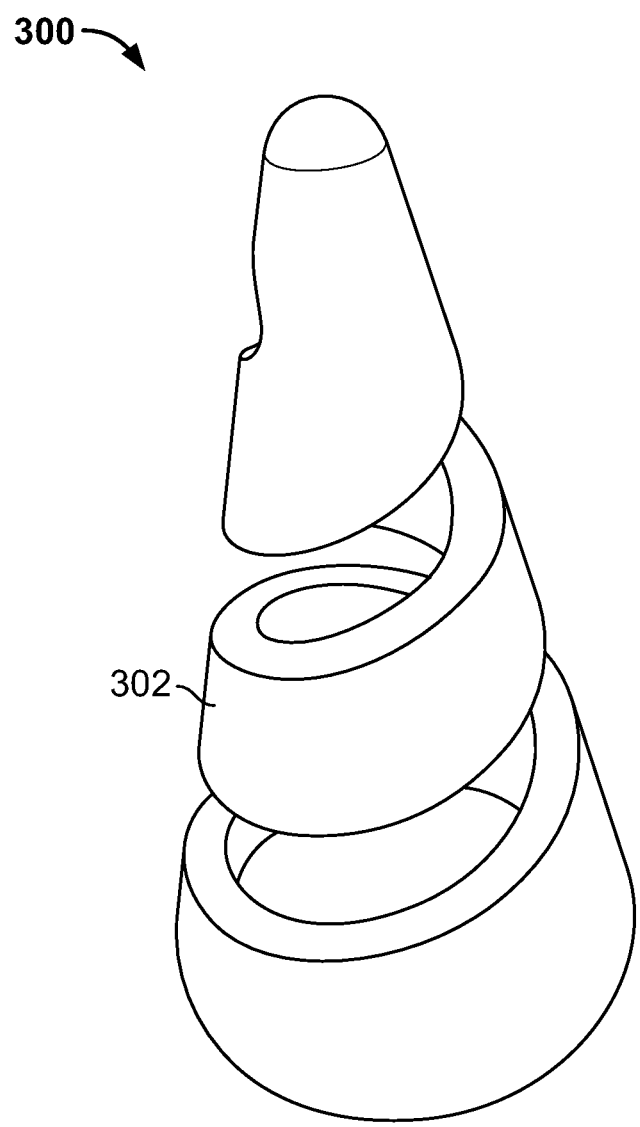
FIG. 3 is an illustration of a portion of an example mixing structure.

Referring to FIG. 3, an example of a mixing structure 300 is illustrated. The mixing structure 300 is configured to be received within the interior chamber 106 of the container 102 and mix the product. In an example, the mixing structure 300 is movable within the interior chamber 106 of the container 102 with respect to the wall 104. The mixing structure 300 can move freely within the interior chamber 106. As such, when the mixing assembly 100 is moved, shook, rotated, etc. by a user, the mixing structure 300 can cause a vortex flow of the product within the container 102, thus facilitating mixing of the product.

The mixing structure 300 can comprise a body portion 302. The body portion 302 has a substantially conical shape. While the body portion 302 may comprise any number of different materials, in an example, the body portion 302 may comprise a plastic material, a composite material, etc. The body portion 302 is substantially rigid so as to reduce the likelihood of deformation, bending, etc. when the body portion 302 is moved within the container 102 and makes contact with the wall 104 of the container 102.

Figure 4:
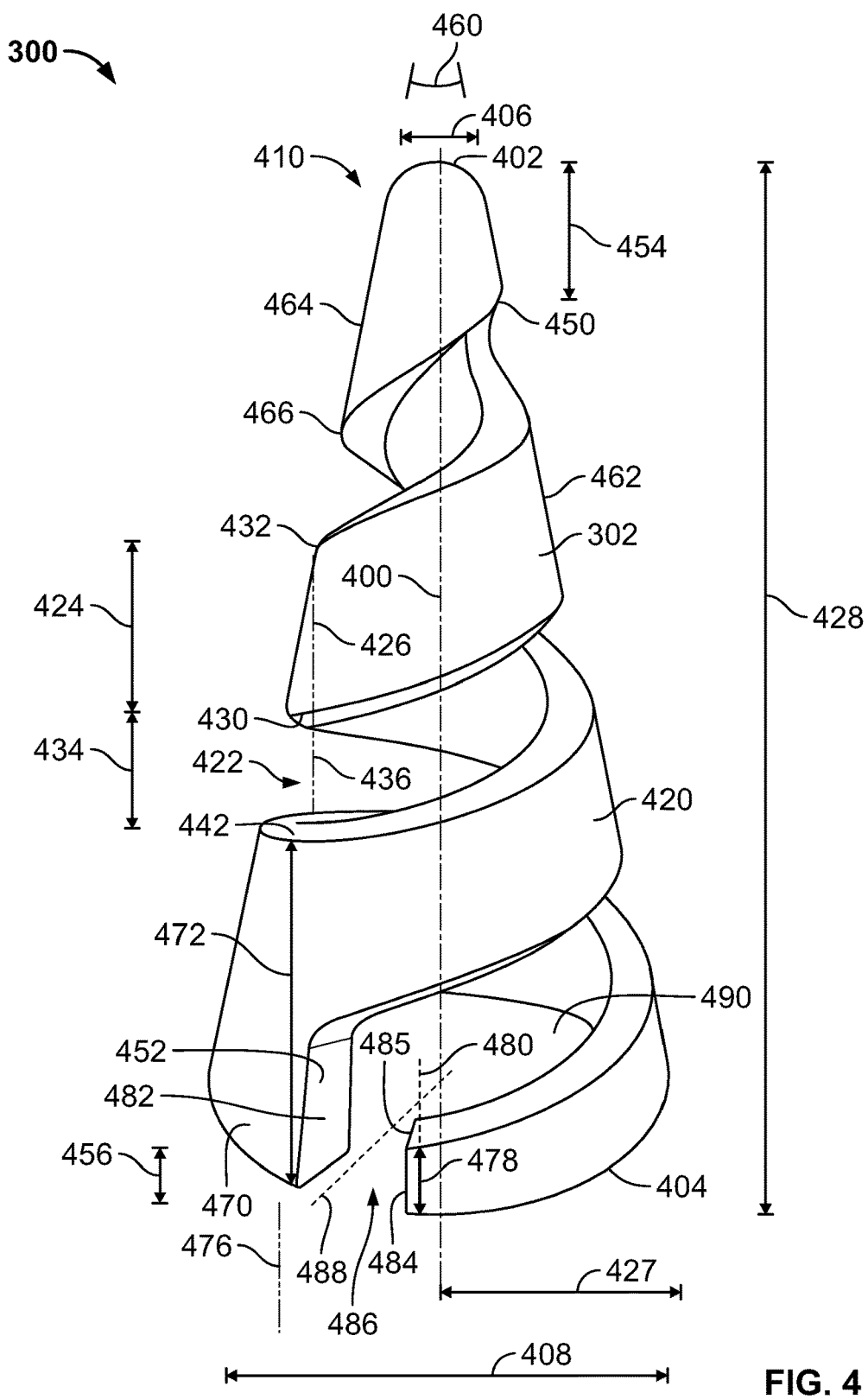
FIG. 4 is an illustration of a portion of an example mixing structure.
Figure 5:
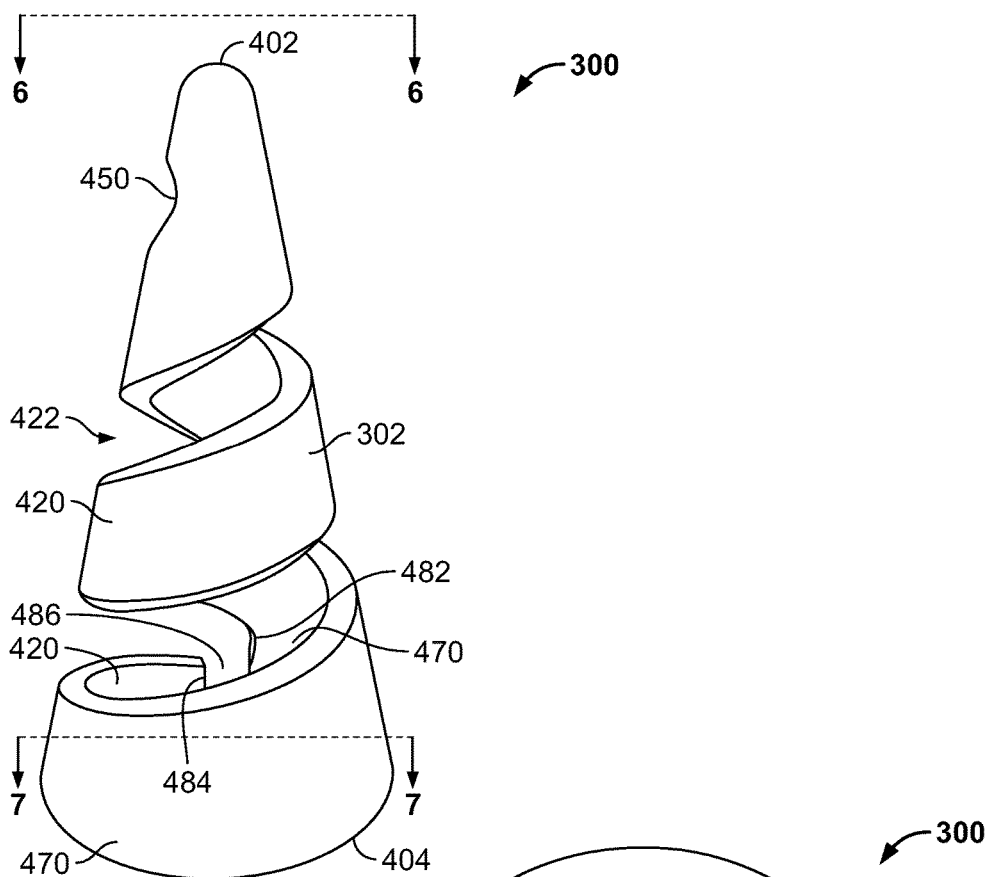
FIG. 5 is an illustration of a portion of an example mixing structure.

Referring to FIGS. 4 and 5, the mixing structure 300 is further illustrated. In this example, the body portion 302 can extend along a body axis 400 between a first end 402 of the body portion 302 and a second end 404 of the body portion 302. The body portion 302 extends concentrically about the body axis 400, such that the body axis 400 extends through a center of the body portion 302 between the first end 402 and the second end 404 of the body portion 302.

The mixing structure 300 can have a varying cross-sectional size along the body axis 400. For example, the first end 402 of the body portion 302 can have a first cross-sectional size 406. The second end 404 of the body portion 302 can have a second cross-sectional size 408. In an example, the second cross-sectional size 408 may be larger than the first cross-sectional size 406. That is, the body portion 302 can have a tapered shape along the body axis 400, such that the body portion 302 has an increasing cross-sectional size from the first end 402 to the second end 404.

The second cross-sectional size 408 may be less than a cross-sectional size of the container 102, such that the mixing structure 300 can be received within the interior chamber 106 of the container 102. In an example, a length of the mixing structure 300 (e.g., as measured between the first end 402 and the second end 404) can be greater than the cross-sectional size of the container 102. As such, when a user inserts the mixing structure 300 into the interior chamber 106, the mixing structure 300 is limited from being inverted. That is, the mixing structure 300 may be inserted such that the first end 402 of the mixing structure 300 faces a bottom of the container 102 while the second end 404 of the mixing structure 300 may face a top (e.g., an opening and the cover 110) of the container 102. In such an example, due to the dimensions of the mixing structure 300, the relative positions of the first end 402 and the second end 404 with respect to the container 102 may remain in place, despite the container 102 being moved, shaken, rotated, etc. Accordingly, in the previous example, when the container 102 is moved, shaken, rotated, etc., the first end 402 of the mixing structure 300 may remain facing the bottom of the container 102 while the second end 404 of the mixing structure 300 may remain facing the top of the container 102.

In the illustrated example, the first end 402 of the body portion 302 can define a substantially conically shaped tip 410. The tip 410 can be substantially solid and may be free of voids, openings, channels, etc. The tip 410 may have a rounded end, such that the tip 410 can access corners of the container 102. In this way, the tip 410 can function to remove non-liquid portions of the product from the corners of the container 102 and improve mixing of the product. The mixing structure 300 can be oriented such that the first end 402 of the body portion 302 faces a bottom of the container 102 (e.g., opposite the opening and the cover 110 at the top). Such an orientation allows for the tip 410 to engage and contact the lower corners of the container 102, such that the tip 410 can remove non-liquid portions of the product that adhere to, are stuck within, etc. the lower corners of the container 102.

The body portion 302 comprises a wall 420 that extends helically about the body axis 400 between the first end 402 and the second end 404. In this example, the wall 420 can define a channel 422 (e.g., an opening, a void, etc.) that extends helically about the body axis 400 between the first end 402 and the second end 404. By extending helically, the wall 420 and the channel 422 can have a first cross-sectional size at a first location (e.g., adjacent to the first end 402), and a second cross-sectional size at a second location (e.g., adjacent to the second end 404). The first cross-sectional size may be less than the second cross-sectional size. The wall 420 and the channel 422 can extend and/or wrap around the body axis 400 with a constantly increasing cross-sectional size from the first end 402 towards the second end 404.

The wall 420 can have a wall length 424, along a wall axis 426 that is substantially parallel to the body axis 400, between a first edge 430 of the wall 420 and a second edge 432 of the wall 420. In an example, the channel 422 can have a channel length 434, along a channel axis 436 that is substantially parallel to the body axis 400 and/or the wall axis 426, between the first edge 430 of the wall 420 and a third edge 442 of the wall 420. In an example, the first edge 430 and the second edge 432 define opposing edges of the wall at a location along the wall axis 426. The first edge 430 and the third edge 442 can define opposing edges of the channel 422 at a location along the channel axis 436. In this example, there may not be a portion of the wall located between the first edge 430 and the third edge 442, such that the first edge 430 and the third edge 442 are separated from each other by the channel 422.

In an example, the wall length 424 of the wall 420 may be larger than the channel length 434 of the channel 422. That is, as measured along the wall axis 426, the wall 420 can have a length (e.g., the wall length 424) that is larger than a length (e.g., the channel length 434) of the channel 422, as measured along the channel axis 436. In an example, the wall length 424 may be substantially constant between the first end 402 and the second end 404. Likewise, in an example, the channel length 434 may be substantially constant between the first end 402 and the second end 404. In other examples, the dimensions of the wall 420 and/or the channel 422 are not so limited. For example, the wall 420 can have a non-constant wall length 424 between the first end 402 and the second end 404, such that the wall 420 can have an increasing, a decreasing, etc. wall length 424. Likewise, in an example, the channel 422 can have a non-constant channel length 434 between the first end 402 and the second end 404, such that the channel 422 can have an increasing, a decreasing, etc. channel length 434.

In an example, the surface area of an exterior surface of the body portion 302 (e.g., of the solid portions) can comprise at least about 50% of a total possible surface area of the body portion 302 (e.g., the solid portions and the channels 422). The surface area may be represented as:

$$A = \pi r (r + \sqrt{(h^2 + r^2)})$$

In the above equation, the surface area is defined by the variable A. The radius of the second end 404 of the body portion 302 is defined by r. The length (e.g., or height) of the body portion 302 between the first end 402 and the second end 404 is defined by h. In the illustrated example, the radius (r) is identified with reference number 427. The length of the body portion 302 (h) is defined with the reference number 428.

In an example, a surface area of the channel 422 as defined between the wall 420 may be less than about 50% of a total possible surface area of the body portion 302 (e.g., the solid portions and the channels 422). In such an example, the surface area of an exterior surface of the body portion 302 (e.g., of the solid portions) may be larger than the surface area of the channel 422 as defined between the wall 420. In another example, the surface area of an exterior surface of the body portion 302 (e.g., of the solid portions) can comprise at least about 60% of a total possible surface area of the body portion 302 (e.g., the solid portions and the channels 422).

In this way, the body portion 302 of the mixing structure 300 may be substantially solid but for the channel 422 and other opening(s) defined within the body portion 302. As a result, mixing of the product is improved. For example, the product may contact the wall 420 and/or other solid portions of the body portion 302, with a reduced likelihood of the product passing through the channel 422 without contact the wall 420.

The channel 422 can extend between a first channel end 450 and a second channel end 452. In an example, the first channel end 450 of the channel 422 may be spaced a first channel distance 454 from the first end 402 of the body portion 302. The first channel distance 454 may be substantially equal to the channel length 434. In an example, the second channel end 452 of the channel 422 may be spaced a second channel distance 456 from the second end 404 of the body portion 302. The second channel distance 456 may be less than the channel length 434 of the channel 422.

In an example, the first channel end 450 of the channel 422 may be axially offset from the second channel end 452 of the channel 422. For example, as illustrated in FIG. 4, an axis may intersect the first channel end 450, with the axis extending substantially parallel to the body axis 400. In such an example, the axis may not intersect the second channel end 452. Rather, the second channel end 452 may be offset from the first channel end 450, such that the first channel end 450 and the second channel end 452 do not lie in an axis that is substantially parallel to the body axis 400. This offset of the first channel end 450 and the second channel end 452 can assist in mixing the product.

An angle 460 can be defined between a first side 462 of the body portion 302 and a second side 464 of the body portion 302 that is opposite the first side 462. In an example, the angle 460 may be between about 15 degrees to about 45 degrees. The angle 460 allows for the mixing structure 300 to access corners of the container 102, such that the tip 410 can function to remove the non-liquid portions of the product.

In an example, the body portion 302 can define a substantially planar outer surface 466 between the first end 402 and the second end 404. The outer surface 466 can comprise the first side 462, the second side 464, etc. By being substantially planar, the outer surface 466 can assist in mixing the product by contact and scraping an interior surface of the wall 104 of the container 102. As an example, the tip 410 of the body portion 302 can contact and/or scrape against a corner of the container 102. Concurrently, the outer surface 466 can contact the wall 104 of the container 102. The outer surface 466 may be substantially parallel to and in contact with the wall 104. As such, the mixing structure 300 can move in flush contact with the wall 104 as the container 102 is moved, shaken, rotated, etc. In such an example, the mixing structure 300 can function to remove non-liquid portions of the product (e.g., powder, etc.) from the wall 104, such as by scraping the wall 104.

The body portion 302 may comprise a second end base 470 located at the second end 404 of the body portion 302. The second end base 470 can define a solid area of the body portion 302 between the channel 422 and the second end 404. The second end base 470 can have a second base length 472 as measured from the second end 404. The second base length 472 can be measured along a second base axis 476 that extends between the first end 402 and the second end 404, with the second base axis 476 substantially parallel to the body axis 400. In this example, the second base length 472 may be larger than the wall length 424. Similarly, in this example, the second base length 472 may be larger than the channel length 434. In the illustrated example, the second base length 472 may be larger than a sum of the wall length 424 and the channel length 434.

The second end base 470 can assist in mixing the product within the container 102. For example, the second end base 470 has the non-constant base length (e.g., the second base length 472, etc.) at different circumferential locations about the second end 404 of the body portion 302. As the mixing structure 300 is rotated, the product can contact the second end base 470 and pass through the channel 422 at the second channel end 452.

The second end base 470 comprises a base wall 482 that defines an end of the second end base 470. The base wall 482 can extend parallel to the body axis 400. In an example, the base wall 482 extends from the second end 404 to the wall 420. In this way, the base wall 482 can define an end of the channel 422, such as the second channel end 452. The base wall 482 of the second end base 470 can be spaced a distance apart from a wall end 484 of the wall 420. The wall end 484 can have a wall end length 478 that extends along a wall end axis 480. In an example, the wall end axis 480 is parallel to the body axis 400. The wall end length 478 may be less than the second base length 472 of the second end base 470.

In an example, the wall end 484 can define a wall end surface 485 that extends parallel to the body axis 400. In an example, the wall end surface 485 of the wall end 484 can be spaced apart from the base wall 482 of the second end base 470 to define an opening 486. An end axis 488 can extend perpendicular to the body axis 400 from a center of the second end 404 of the body portion 302 radially outwardly to an exterior of the body portion 302. The end axis 488 can pass through the opening 486 defined by the wall 420 such that the end axis 488 does not intersect any of the body portion 302. In an example, the body portion 302 can define an end opening 490 at the second end 404 of the body portion 302, with the end opening 490 surrounded less than 360 degrees at the second end 404. In an example, the wall defining the opening 486 can define an angle with respect to the center of the second end 404 of the body portion 302 that is between about 1 degree to about 10 degrees.

Referring to FIG. 5, a perspective view of the mixing structure 300 is illustrated from a viewing angle that is opposite the viewing angle of FIG. 4. In an example, the opening 486 may be defined between the base wall 482 of the second end base 470 and the wall end 484 of the wall 422.

Figure 6:
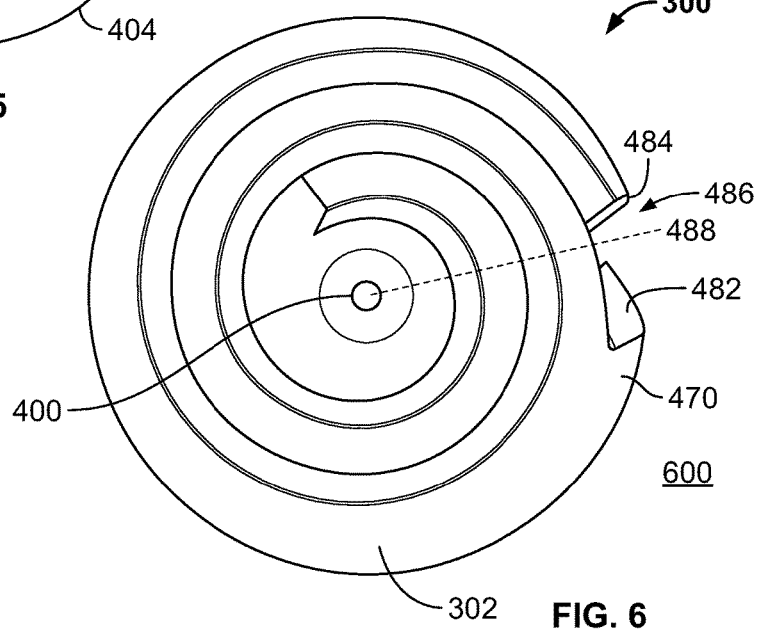
FIG. 6 is an illustration of a portion of an example mixing structure.

Referring to FIG. 6, a top-down view of the mixing structure 300 as viewed from 6-6 of FIG. 5 is illustrated. In an example, the end axis 488 can extend perpendicular to the body axis 400 (e.g., where the body axis 400 extends into and out of the page) from the center of the second end 404 of the body portion 302 radially outwardly to an exterior 600 of the body portion 302. In an example, the end axis 488 can pass through the opening 486 defined by the wall 420 and the second end base 470 such that the end axis 488 does not intersect any of the body portion 302.

Figure 7:
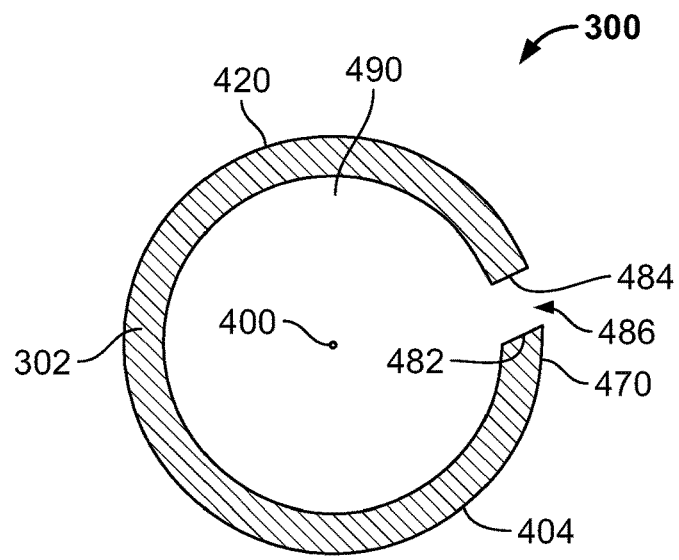
FIG. 7 is an illustration of a portion of an example mixing structure.

Referring to FIG. 7, a cross-sectional view of the mixing structure 300 as viewed from 7-7 of FIG. 5 is illustrated. In an example, due to the opening 486 being defined at the second end 404 of the body portion 302, the end opening 490 can be surrounded less than 360 degrees at the second end 404. For example, the end opening 490 may have a substantially circular shape, and may be at least partially surrounded by the wall 420 and the second end base 470. However, due to the opening 486 defined between the wall 420 and the second end base 470, the end opening 490 is not surrounded 360 degrees by the wall 420 and the end base 470. Rather, in an example, the end opening 490 may be surrounded between about 300 degrees to about 355 degrees by the wall 420 and the end base 470 at the second end 404.

Figure 8:
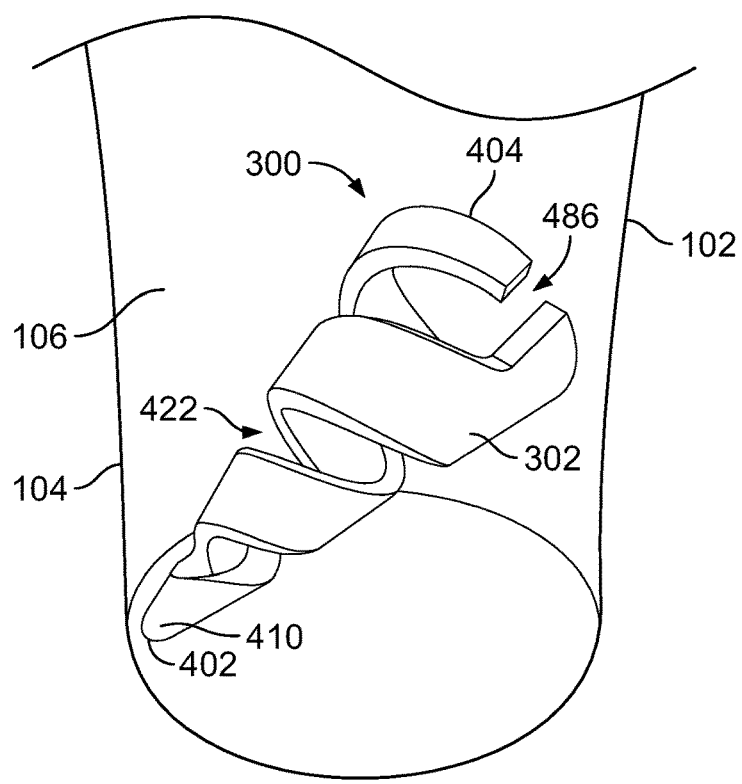
FIG. 8 is an illustration of an example mixing assembly.

Turning to FIG. 8, a bottom of the mixing assembly 100 is illustrated. In this example, the mixing structure 300 can be received within the interior chamber 106 of the container 102. The mixing structure 300 may be freely movable within the interior chamber 106. As such, a user can move the container 102, such as by rotating, shaking, etc. the container 102. As the user moves/rotates/shakes the container 102, the conically shaped tip 410 may engage corners of the container 102. This engagement can reduce the likelihood of product settling in the corners and not mixing. Instead, the conically shaped tip 410 can cause the product in the corners of the container 102 to be mixed/blended.

In addition, the outer surface 466 of the mixing structure 300 is substantially planar, such that the outer surface 466 can be substantially flush with and in contact with the wall 104 of the container 102. As the user moves/rotates/shakes the container 102, the outer surface 466 can contact/engage the wall 104 of the container. This engagement can reduce the likelihood of product adhering to the wall 104 and not mixing properly. Instead, the outer surface 466 can function to remove at least some of the product that adheres to the wall 104, thus facilitating mixing of the product.

The structure of the mixing structure 300 can allow for some of the product to flow through the channel 422. As the product flows through the channel 422, the product is mixed. In addition, the mixing structure 300 can rotate within the interior chamber 106 of the container 102. This rotation can cause a vortex, in which the product rotates about an axis. The formation of the vortex by the mixing structure 300 can further cause mixing of the product. As such, due to the mixing assembly 100 being moved/shaken/rotated, the mixing structure 300 can cause the product located within the interior chamber 106 to be mixed from a heterogeneous composition to a homogeneous composition.

In addition to the aforementioned benefits, the opening 486 in the body portion 302 can allow for further mixing of the product. For example, the opening 486 can allow for the wall 420 at the second end 404 to flex in response to a force applied upon the body portion 302. This flexing can assist in mixing the product. In addition, the product to be mixed can flow through the opening 486, such that the product flows between an interior of the body portion 302 and the exterior 600 of the body portion 302. Due to the product flow through the opening 486, the likelihood of product adhering to the second end 404 of the body portion 302 is reduced, thus improving the mixing. Further, in addition to the improved mixing properties due to the opening 486, a total weight of the mixing structure 300 may be reduced due to less material being used to form the body portion 302.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A mixing assembly comprising:
   a container having a container wall that defines an interior chamber within which a product to be mixed is received; and
   a mixing structure configured to be received within the interior chamber and mix the product, the mixing structure having:
     a body portion that extends along a body axis between a first end of the body portion and a second end of the body portion, the first end of the body portion having a first cross-sectional size, the second end of the body portion having a second cross-sectional size that is larger than the first cross-sectional size, the body portion having:
       a wall that extends helically about the body axis between the first end and the second end, the wall having a wall length, along a wall axis that is substantially parallel to the body axis, between a first edge of the wall and a second edge of the wall, the wall defining:
         a channel that extends helically about the body axis between the first end and the second end, the channel having a channel length, along a channel axis that is substantially parallel to the body axis, between the first edge of the wall and a third edge of the wall, the wall length larger than the channel length;
       wherein an end axis extends perpendicular to the body axis from a center of the second end of the body portion radially outwardly to an exterior of the body portion, the end axis passing through an opening defined by the wall such that the end axis does not intersect any of the body portion, wherein a cross-section of the mixing structure at a location along the body axis between the first end and a first channel end of the channel yields an ellipse.

2. The mixing assembly of claim 1, the mixing structure movable within the container with respect to the container wall, the product flowing through the channel to mix the product as the mixing structure moves within the container.

3. The mixing assembly of claim 1, the body portion defining an end opening at the second end of the body portion.

4. The mixing assembly of claim 3, wherein the end opening is surrounded by the wall less than 360 degrees at the second end.

5. The mixing assembly of claim 1, wherein the body portion defines a second end base located at the second end of the body portion, the second end base defining a solid area of the body portion between the channel and the second end.

6. The mixing assembly of claim 5, wherein an end of the wall is spaced a distance apart from the second end base at the second end of the body portion to define an opening.

7. The mixing assembly of claim 1, the first channel end of the channel spaced a first channel distance from the first end of the body portion.

8. The mixing assembly of claim 7, the first channel distance substantially equal to the channel length.

9. The mixing assembly of claim 1, wherein the ellipse is a circle.

10. The mixing assembly of claim 1, wherein the body portion has a substantially conically shaped tip.

11. A mixing assembly comprising:
    a container having a container wall that defines an interior chamber within which a product to be mixed is received; and
    a mixing structure configured to be received within the interior chamber and mix the product, the mixing structure movable within the container with respect to the container wall, the mixing structure having:
      a body portion that extends along a body axis between a first end of the body portion and a second end of the body portion, the first end of the body portion having a first cross-sectional size, the second end of the body portion having a second cross-sectional size that is larger than the first cross-sectional size, the body portion having:
        a wall that extends helically about the body axis between the first end and the second end, the wall defining a channel that extends helically about the body axis between a first channel end and a second channel end, the first channel end of the channel spaced a first channel distance from the first end of the body portion, the first channel distance greater than zero, the product flowing through the channel to mix the product as the mixing structure moves within the container;
        wherein an end axis extends perpendicular to the body axis from a center of the second end of the body portion radially outwardly to an exterior of the body portion, the end axis passing through an opening defined by the wall such that the end axis does not intersect any of the body portion, wherein a cross-section of the mixing structure at a location along the body axis between the first end and the first channel end yields an ellipse.

12. The mixing assembly of claim 11, wherein the wall defining the opening defines an angle with respect to the center of the second end of the body portion that is between about 1 degree to about 10 degrees.

13. The mixing assembly of claim 11, the body portion defining an end opening at the second end of the body portion.

14. The mixing assembly of claim 13, wherein the end opening is surrounded by the wall less than 360 degrees at the second end.

15. The mixing assembly of claim 11, wherein the body portion defines a second end base located at the second end of the body portion, the second end base defining a solid area of the body portion between the channel and the second end.

16. The mixing assembly of claim 15, wherein an end of the wall is spaced a distance apart from the second end base at the second end of the body portion to define an opening.

17. The mixing assembly of claim 11, wherein the ellipse is a circle.

18. A mixing assembly comprising:
   a mixing structure configured to be received within an interior chamber of a container, the mixing structure configured to be movable within the container to mix a product, the mixing structure having:
      a body portion that extends along a body axis between a first end of the body portion and a second end of the body portion, the first end of the body portion having a first cross-sectional size, the second end of the body portion having a second cross-sectional size that is larger than the first cross-sectional size, the body portion having:
         a wall that extends helically about the body axis between the first end and the second end, the wall defining a channel that extends helically about the body axis between the first end and the second end;
      wherein an end axis extends perpendicular to the body axis from a center of the second end of the body portion radially outwardly to an exterior of the body portion, the end axis passing through an opening defined by the wall such that the end axis does not intersect any of the body portion, wherein a cross-section of the mixing structure at a location along the body axis between the first end and a first channel end of the channel yields an ellipse.

19. The mixing assembly of claim 18, the first end of the body portion defining a substantially conical shape.

20. The mixing assembly of claim 18, wherein the ellipse is a circle.

* * * * *